United States Patent
Yoo et al.

(10) Patent No.: US 12,046,416 B2
(45) Date of Patent: Jul. 23, 2024

(54) COMPOSITE MATERIAL

(71) Applicant: LG CHEM, LTD., Seoul (KR)

(72) Inventors: Dong Woo Yoo, Daejeon (KR); Jong Min Shin, Daejeon (KR); Jin Kyu Lee, Daejeon (KR)

(73) Assignee: LG Chem, LTD., Seoul (KR)

( * ) Notice: Subject to any disclaimer, the term of this patent is extended or adjusted under 35 U.S.C. 154(b) by 832 days.

(21) Appl. No.: 17/251,296

(22) PCT Filed: Jun. 28, 2019

(86) PCT No.: PCT/KR2019/007901
§ 371 (c)(1),
(2) Date: Dec. 11, 2020

(87) PCT Pub. No.: WO2020/005015
PCT Pub. Date: Jan. 2, 2020

(65) Prior Publication Data
US 2021/0265112 A1 Aug. 26, 2021

(30) Foreign Application Priority Data
Jun. 29, 2018 (KR) ........................ 10-2018-0075961

(51) Int. Cl.
*H01F 41/14* (2006.01)
*C09D 123/12* (2006.01)
(Continued)

(52) U.S. Cl.
CPC ........... *H01F 41/14* (2013.01); *C09D 123/12* (2013.01); *C09D 133/12* (2013.01);
(Continued)

(58) Field of Classification Search
CPC .. H01F 41/14; H01F 1/14708; H01F 1/14766; C09D 123/12; C09D 133/12;
(Continued)

(56) References Cited

U.S. PATENT DOCUMENTS 7,632,565 B1 * 12/2009 Imam ..................... B32B 15/02
428/307.3
8,641,918 B2 2/2014 Hussain et al.
(Continued)

FOREIGN PATENT DOCUMENTS

CN 102136331 A 7/2011
CN 104134513 A 11/2014
(Continued)

OTHER PUBLICATIONS

[NPL-1] Ji (KR 10-1552425 B1); Sep. 10, 2015 (KIPRIS machine translation to English). (Year: 2015).*
(Continued)

*Primary Examiner* — David Sample
*Assistant Examiner* — Donald M Flores, Jr.
(74) *Attorney, Agent, or Firm* — Saliwanchik, Lloyd & Eisenschenk

(57) ABSTRACT

The present application relates to a composite material. According to the present application, a composite material having high magnetic permeability and excellent other physical properties such as flexibility, electrical insulation, mechanical properties and/or resistance to heat or oxidation can be provided in a simple and economical process.

16 Claims, 2 Drawing Sheets

(51) Int. Cl.
*C09D 133/12* (2006.01)
*C09D 163/00* (2006.01)
*C09D 183/04* (2006.01)
*C22C 38/02* (2006.01)
*C22C 38/08* (2006.01)
*C22C 38/12* (2006.01)
*C22C 38/16* (2006.01)
*H01F 1/147* (2006.01)
*B05D 7/14* (2006.01)

(52) U.S. Cl.
CPC ......... *C09D 163/00* (2013.01); *C09D 183/04* (2013.01); *C22C 38/02* (2013.01); *C22C 38/08* (2013.01); *C22C 38/12* (2013.01); *C22C 38/16* (2013.01); *H01F 1/14708* (2013.01); *H01F 1/14766* (2013.01); *B05D 7/14* (2013.01); *C22C 2202/02* (2013.01)

(58) Field of Classification Search
CPC .... C09D 163/00; C09D 183/04; C22C 38/02; C22C 38/08; C22C 38/12; C22C 38/16; C22C 2202/02; B05D 7/14
See application file for complete search history.

(56) References Cited

U.S. PATENT DOCUMENTS

| | | | |
|---|---|---|---|
| 2006/0204741 A1* | 9/2006 | Rehbein | C22C 9/00 427/372.2 |
| 2014/0141232 A1 | 5/2014 | Hong et al. | |

FOREIGN PATENT DOCUMENTS

| | | | | |
|---|---|---|---|---|
| EP | 2521143 A1 | * | 11/2012 | ......... H01F 1/14708 |
| EP | 2521143 A1 | | 11/2012 | |
| JP | 2001527656 A | | 12/2001 | |
| JP | 2004289063 A | | 10/2004 | |
| JP | 4308328 B2 | | 8/2009 | |
| JP | 2009272500 A | * | 11/2009 | |
| JP | 2009272500 A | | 11/2009 | |
| JP | 4446593 B2 | | 4/2010 | |
| JP | 2011036007 A | | 2/2011 | |
| JP | 2011214082 A | | 10/2011 | |
| JP | 2014534645 A | | 12/2014 | |
| KR | 200338459 Y1 | | 1/2004 | |
| KR | 20050113937 A | | 12/2005 | |
| KR | 20110122275 A | | 11/2011 | |
| KR | 20140074642 A | | 6/2014 | |
| KR | 1552425 B1 | * | 9/2015 | ............ B32B 15/04 |
| KR | 101552425 B1 | | 9/2015 | |
| KR | 20180062172 A | | 6/2018 | |

OTHER PUBLICATIONS

[NPL-2] Fukase et al. (JP 2009-272500 A), Nov. 19, 2009 (EPO machine translation to English). (Year: 2009).*
[NPL-3] Norman (EP 2521143 A1), Nov. 7, 2012 (EPO machine translation to English). (Year: 2012).*
European Office Action corresponding to EP Application No. 19826106.7, mailed May 17, 2023, 7 pages.
Extended European Search Report corresponding to EP 19826106.7 mailed Aug. 3, 2021 (8 pages).
International Search Report corresponding to PCT/KR2019/007901; dated Oct. 4, 2019 (5 pages, including English translation).
Office Action dated Oct. 25, 2023 in Chinese Application No. 201980040572.3.

* cited by examiner

COMPOSITE MATERIAL

CROSS REFERENCE TO RELATED APPLICATIONS

This application is a 35 U.S.C. § 371 national stage application of PCT International Application No. PCT/KR2019/007901, filed Jun. 28, 2019, which claims priority from Korean Patent Application No. 10-2018-0075961, filed Jun. 29, 2018, the contents of which are incorporated herein in their entireties by reference. The above-referenced PCT International Application was published in the Korean language as International Publication No. WO2020/005015 on Jan. 2, 2020.

TECHNICAL FIELD

The present application relates to a composite material.

BACKGROUND ART

Materials having high magnetic permeability can be used for various applications. For example, the material can be used in various devices, and the like including an EMC core, a low-power high-inductance resonance circuit or a broadband transformer, and the like, and can also be used as a wave absorber.

As the material having high magnetic permeability, a rolled product of a metal having high permeability or a polymer composite film containing metal particles as a filler is usually used.

However, the method of rolling and the like has complicated processes because in order to obtain a product having high magnetic permeability, a multicomponent material must be used or crystallization must proceed, and also has a problem of high price.

In order to secure high magnetic permeability by applying the metal particle filler, it is necessary to increase the amount of metal particles used, which causes a decrease in flexibility and a decrease in electrical insulation.

DISCLOSURE

Technical Problem

The present application relates to a composite material. It is one object of the present application to be capable of providing a composite material having high magnetic permeability and excellent other physical properties such as flexibility and electrical insulation in a simple and economical process.

Technical Solution

Among physical properties referred to in this specification, the physical properties that the measurement temperature and/or the measurement pressure affect the results are the results measured at room temperature and/or normal pressure, unless otherwise specified.

The term room temperature is a natural temperature without warming or cooling, which means, for example, any one temperature in a range of 10° C. to 30° C., or a temperature of 23° C. or about 25° C. or so. Also, in this specification, the unit of temperature is Celsius (° C.), unless otherwise specified.

The term normal pressure is a natural pressure without pressurizing or depressurizing, which means, usually, about 1 atm or so of atmospheric pressure.

In this specification, in the case of physical properties in which the measurement humidity affects the results, the relevant physical properties are the physical properties measured at natural humidity which is not particularly controlled at the room temperature and/or normal pressure state.

The present application relates to a composite material. The composite material of the present application may comprise a metal foam and a polymer component. The composite material may exhibit high magnetic permeability due to multiple reflection and absorption by unique surface area and pore characteristics of the metal foam. The composite material of the present application has excellent mechanical strength and flexibility, excellent stability against oxidation and/or high temperature, and excellent electrical insulation, and the like, and can also solve the peeling problem that occurs when it has been included in various devices. The composite material of the present application can also be manufactured through a simple and economical process.

In this specification, the term metal foam or metal skeleton means a porous structure comprising a metal or a metal alloy as a main component. Here, the fact that a metal or the like uses as a main component means that the ratio of the metal or the like is 55 wt % or more, 60 wt % or more, 65 wt % or more, 70 wt % or more, 75 wt % or more, 80 wt % or more, 85 wt % or more, 90 wt % or more, or 95 wt % or more based on the total weight of the metal foam or the metal skeleton. The upper limit of the ratio of the metal or the like contained as the main component is not particularly limited, and for example, the ratio may be 100 wt % or less, 99 wt % or less, or 98 wt % or less or so.

In this specification, the term porousness may mean a case where it has a porosity of at least 10% or more, 20% or more, 30% or more, 40% or more, 50% or more, 60% or more, 70% or more, 75% or more, or 80% or more. The upper limit of the porosity is not particularly limited, which may be, for example, less than about 100%, about 99% or less, about 98% or less, about 95% or less, about 90% or less, about 85% or less, 80% or less, or about 75% or less or so. Therefore, the metal foam may have the above-mentioned porosity, and this porosity can be calculated in a known manner by calculating the density of the metal foam or the like.

The shape of the metal foam contained in the composite material is not particularly limited, but may be a film shape in one example. In the composite material of the present application, a polymer component existing on the surface or in the interior of the metal foam in the film form is added. Such a polymer component may form a surface layer on at least one surface of the metal foam or may be present in a state of filling pores inside the metal foam, and in some cases, it may also fill pores inside the metal foam while forming the surface layer.

Such a polymer component may form a surface layer on at least one surface of the metal foam, or may be filled and present in the voids inside the metal foam, and in some cases, it may also be filled into the metal foam while forming the surface layer. In the case of forming a surface layer, the polymer component may form the surface layer on at least one surface, some surfaces, or all surfaces among surfaces of the metal foam. In one example, the polymer component may form the surface layer on at least the upper and/or lower surfaces, which are the main surfaces of the metal foam. The surface layer may be formed to cover the entire surface of the metal foam, or may also be formed to cover only a part of the surface.

The metal foam in the composite material may have a porosity of about 10% or more. The metal foam having this porosity has a porous metal framework forming a suitable network, and thus it can ensure high magnetic permeability even if a small amount of the relevant metal foam is applied. In another example, the porosity may be 15% or more, 20% or more, 25% or more, 30% or more, 35% or more, 40% or more, 45% or more, 50% or more, 55% or more, 60% or more, 65% or more, or 70% or more, or may be 99% or less, 98% or less, about 95% or less, about 90% or less, 85% or less, about 80% or less, or about 75% or less or so.

The pore characteristics of the metal foam can be further controlled to ensure proper magnetic permeability and the like. For example, the metal foam may include approximately spherical, needle or random shape pores.

For example, the size of the pore with the maximum size of pores included in the metal foam may be about 50 μm or less, 45 μm or less, 40 μm or less, 35 μm or less, or 30 μm or less or so. In another example, the maximum pore size may be about 2 μm or more, 4 μm or more, 6 μm or more, 8 μm or more, 10 μm or more, 12 μm or more, 14 μm or more, 16 μm or more, 18 μm or more, 20 μm or more, 22 μm or more, 24 μm or more, or 26 μm or more.

Here, the pore with the maximum size among pores of the metal foam is a pore which is confirmed as the maximum size when confirmed by the method described in examples to be described below. In addition, the pore size is a size confirmed by the method shown in examples to be described below, and when the pore is circular, it may mean the diameter of the pore, and when it is not circular, it may mean the length of the long axis which is the measured longest length.

In the metal foam, 85% or more pores of the whole pores of the metal foam may have a pore size of 10 μm or less and 65% or more pores may have a pore size of 5 μm or less. Here, the method of confirming a pore size is as described above. Here, the lower limit of the pore size of the pores having a pore size of 10 μm or less or 5 μm or less is not particularly limited, but in one example, the pore size may be more than about 0 μm, 0.1 μm or more, 0.2 μm or more, 0.3 μm or more, 0.4 μm or more, 0.5 μm or more, 0.6 μm or more, 0.7 μm or more, 0.8 μm or more, 0.9 μm or more, 1 μm or more, 1.1 μm or more, 1.2 μm or more, 1.3 μm or more, 1.4 μm or more, 1.5 μm or more, 1.6 μm or more, 1.7 μm or more, 1.8 μm or more, 1.9 μm or more, or 2 μm or more.

Here, the pores having a pore size of 10 μm or less of the whole pores may be 100% or less, 95% or less, or 90% or less or so, and the ratio of the pores having a pore size of 5 μm or less may be 100% or less, 95% or less, 90% or less, 85% or less, 80% or less, 75% or less, or 70% or less or so.

The desired composite material can be produced by this pore distribution or characteristic. For example, when the composite material or metal foam is in the form of a film, the pore distribution may be determined based on the major axis direction of the film.

As described above, the metal foam may be in the form of a film. In this case, the thickness of the film can be adjusted in consideration of the desired magnetic permeability or thickness ratio, and the like, in manufacturing a composite material according to a method to be described below: In order to ensure the target physical property, the thickness of the film may be, for example, about 10 μm or more, about 20 μm or more, about 30 μm or more, about 40 μm or more, about 45 μm or more, about 50 μm or more, about 55 μm or more, about 60 μm or more, about 65 μm or more or about 70 μm or more, 75 μm or more, 80 μm or more, 85 μm or more, 90 μm or more, 95 μm or more, 100 μm or more, 105 μm or more, 110 μm or more, or 115 μm or more. The upper limit of the thickness of the film is controlled according to the purpose, which is not particularly limited, but may be, for example, about 1,000 μm or less, about 900 μm or less, about 800 μm or less, about 700 μm or less, about 600 μm or less, about 500 μm or less, about 400 μm or less, about 300 μm or less, about 200 μm or less or about 150 μm or less, 130 μm or less, 120 μm or less, 110 μm or less, 100 μm or less, or 90 μm or less or so.

In this specification, when the thickness of the relevant target is not constant, the thickness may be a minimum thickness, a maximum thickness or an average thickness of the target.

The metal foam may be a metal foam of a soft magnetic metal component. The term soft magnetic metal component means a soft magnetic metal or metal alloy, where the definition of soft magnetism is as known in the industry. Here, the metal foam of a soft magnetic metal component may be composed of only a soft magnetic metal component or may mean a metal foam containing the metal component as a main component. Accordingly, the metal foam may comprise the soft magnetic metal component in an amount of 55 wt % or more, 60 wt % or more, 65 wt % or more, 70 wt % or more, 75 wt % or more, 80 wt % or more, 85 wt % or more, 90 wt % or more, or 95 wt % or more based on the total weight. The upper limit of the ratio of the soft magnetic metal component is not particularly limited, which may be, for example, 100 wt %, 99 wt % or 98 wt % or so.

An example of specific soft magnetic metal components can be exemplified by an Fe/Ni alloy, an Fe/Ni/Mo alloy, an Fe/Al/Si alloy, an Fe/Si/B alloy, an Fe/Si/Nb alloy, an Fe/Si/Cu alloy or an Fe/Si/B/Nb/Cu alloy, and the like, but is not limited thereto. Here, Fe means iron, Ni means nickel, Mo means molybdenum, Al means aluminum, Si means silicon, B means boron, Nb means niobium, and Cu means copper. However, in the present application, various materials known to have soft magnetism may be applied in addition to the material.

Various methods for producing metal foams are known. In the present application, metal foams manufactured by such a known method can be applied.

As a method for producing a metal foam, a method of sintering a pore-forming agent such as a salt and a composite material of a metal, a method of coating a metal on a support such as a polymer foam and sintering it in this state or a slurry method, and the like is known, where these methods can be all applied in the present application.

In one example, the metal foam applied in the present application may comprise a step of sintering a metal foam precursor comprising the soft magnetic metal component. In the present application, the term metal foam precursor means a structure before the process which is performed to form a metal foam, such as the sintering, that is, a structure before the metal foam is generated. Even if the metal foam precursor is referred to as a porous metal foam precursor, it is not necessarily porous by itself, and it can be referred to as a porous metal foam precursor for convenience, as long as it can finally form a metal foam, which is a porous metal structure.

In the present application, the metal foam precursor can be formed using a slurry containing at least a metal component, a dispersant and a binder, and the desired pore characteristics can be efficiently secured through application of this slurry.

As the metal component, a metal powder can be applied. An example of the applicable metal powder is determined depending on the purpose, which is not particularly limited, and a powder of a metal or a powder of a metal alloy or a powder of a metal mixture, which is capable of forming the above-described soft magnetic metal component, can be applied.

The size of the metal powder is also selected in consideration of the desired porosity or pore size, and the like, which is not particularly limited, but for example, the metal powder may have an average particle diameter in a range of about 0.1 µm to about 200 µm. In another example, the average particle diameter may be about 0.5 µm or more, about 1 µm or more, about 2 µm or more, about 3 µm or more, about 4 µm or more, about 5 µm or more, about 6 µm or more, about 7 µm or more, about 8 µm or more, about 9 µm or more, about 10 µm or more, about 11 µm or more, about 12 µm or more, about 13 µm or more, about 14 µm or more, about 15 µm or more, about 16 µm or more, about 17 µm or more, about 18 µm or more, about 19 µm or more, or about 20 µm or more. In another example, the average particle diameter may be about 150 µm or less, 100 µm or less, 90 µm or less, 80 µm or less, 70 µm or less, 60 µm or less, 50 µm or less, 40 µm or less, 30 µm or less, or 20 µm or less. As the metal in the metal particles, those having different average particle diameters may also be applied. The average particle diameter can be appropriately selected in consideration of the shape of the desired metal foam, for example, the thickness or the porosity of the metal foam.

The average particle diameter of the metal powder referred to in this specification is a so-called median particle diameter, also referred to as D50 particle diameter. This median particle diameter can be obtained by a known particle size analysis method.

The ratio of the metal component (metal powder) in the slurry is not particularly limited, which can be selected in consideration of the desired viscosity, process efficiency, and the like. In one example, the ratio of the metal component in the slurry may be 0.5 to 95% or so based on weight, but is not limited thereto. In another example, the ratio may be about 1% or more, about 1.5% or more, about 2% or more, about 2.5% or more, about 3% or more, about 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, or 80% or more, or may be about 90% or less, about 85% or less, about 80% or less, about 75% or less, about 70% or less, about 65% or less, 60% or less, 55% or less, 50% or less, 45% or less, 40% or less, 35% or less, 30% or less, 25% or less, 20% or less, 15% or less, 10% or less, or 5% or less or so.

The metal foam precursor may be formed using a slurry comprising a dispersant and a binder together with the metal powder.

Here, as the dispersant, for example, an alcohol may be applied. As the alcohol, a monohydric alcohol with 1 to 20 carbon atoms such as methanol, ethanol, propanol, butanol, pentanol, octanol, ethylene glycol, propylene glycol, pentanol, 2-methoxyethanol, 2-ethoxyethanol, 2-butoxyethanol, glycerol, texanol or terpineol, or a dihydric alcohol with 1 to 20 carbon atoms such as ethylene glycol, propylene glycol, hexanediol, octanediol or pentanediol, or a higher polyhydric alcohol, and the like may be used, but the kind is not limited to the above.

The slurry may further comprise a binder. The kind of such a binder is not particularly limited, which may be appropriately selected depending on the kind of the metal component, or dispersant applied upon producing the slurry. For example, the binder can be exemplified by an alkylcellulose having an alkyl group with 1 to 8 carbon atoms such as methylcellulose or ethylcellulose, a polyalkylene carbonate having an alkylene unit with 1 to 8 carbon atoms such as polypropylene carbonate or polyethylene carbonate, or a polyvinyl alcohol-based binder (hereinafter, may be referred to as a polyvinyl alcohol compound) such as polyvinyl alcohol or polyvinyl acetate, and the like, but is not limited thereto.

The ratio of each component in the slurry is not particularly limited. Such a ratio can be adjusted in consideration of the process efficiency such as coating property and moldability at the time of performing the process using the slurry.

For example, in order to more effectively ensure the desired porosity, the binder may be contained in the slurry at a ratio of about 1 to 500 parts by weight relative to 100 parts by weight of the above-described metal component. In another example, the ratio may be about 2 parts by weight or more, about 3 parts by weight or more, about 4 parts by weight or more, about 5 parts by weight or more, about 6 parts by weight or more, about 7 parts by weight or more, about 8 parts by weight or more, about 9 parts by weight or more, about 10 parts by weight or more, about 15 parts by weight or more, about 20 parts by weight or more, about 30 parts by weight or more, about 40 parts by weight or more, about 50 parts by weight or more, about 60 parts by weight or more, about 70 parts by weight or more, about 80 parts by weight or more, about 90 parts by weight or more, about 100 parts by weight or more, about 110 parts by weight or more, about 120 parts by weight or more, about 130 parts by weight or more, about 140 parts by weight or more, about 150 parts by weight or more, about 200 parts by weight or more, or about 250 parts by weight or more, and may be about 450 parts by weight or less, about 400 parts by weight or less, about 350 parts by weight or less, about 300 parts by weight or less, about 250 parts by weight or less, about 200 parts by weight or less, about 150 parts by weight or less, about 100 parts by weight or less, about 50 parts by weight or less, about 40 parts by weight or less, about 30 parts by weight or less, about 20 parts by weight or less, or about 10 parts by weight or less.

In order to more effectively secure the desired pore characteristics, the dispersant may be included in the slurry at a ratio of about 10 to 2,000 parts by weight relative to 100 parts by weight of the binder. In another example, the ratio may be about 20 parts by weight or more, about 30 parts by weight or more, about 40 parts by weight or more, about 50 parts by weight or more, about 60 parts by weight or more, about 70 parts by weight or more, about 80 parts by weight or more, about 90 parts by weight or more, about 100 parts by weight or more, about 200 parts by weight or more, about 300 parts by weight or more, about 350 parts by weight or more, about 400 parts by weight or more, about 500 parts by weight or more, about 550 parts by weight or more, about 600 parts by weight or more, or about 650 parts by weight or more, and may be about 1,800 parts by weight or less, about 1,600 parts by weight or less, about 1,400 parts by weight or less, about 1,200 parts by weight or less or about 1,000 parts by weight or less, about 900 parts by weight or less, about 800 parts by weight or less, about 700 parts by weight or less, about 600 parts by weight or less, about 500 parts by weight or less, or about 450 parts by weight or less.

Unless otherwise specified, the unit weight part herein means a weight ratio between the respective components.

The slurry may further comprise a solvent, if necessary. As the solvent, a suitable solvent may be used in consideration of solubility of the components of the slurry, for example, the metal component or the binder, and the like. For example, as the solvent, one having a dielectric constant in a range of about 10 to 120 can be used. In another example, the dielectric constant may be about 20 or more, about 30 or more, about 40 or more, about 50 or more, about 60 or more, or about 70 or more, or may be about 110 or less, about 100 or less, or about 90 or less. Such a solvent can be exemplified by water or an alcohol with 1 to 8 carbon atoms such as ethanol, butanol or methanol, DMSO (dimethyl sulfoxide), DMF (dimethylformamide) or NMP (N-methylpyrrolidinone), and the like, but is not limited thereto.

When a solvent is applied, it may be present in the slurry at a ratio of about 50 to 400 parts by weight relative to 100 parts by weight of the binder, but is not limited thereto. In another example, the ratio of the solvent may be about 60 parts by weight or more, about 70 parts by weight or more, about 80 parts by weight or more, about 90 parts by weight or more, about 100 parts by weight or more, about 110 parts by weight or more, about 120 parts by weight or more, about 130 parts by weight or more, about 140 parts by weight or more, about 150 parts by weight or more, about 160 parts by weight or more, about 170 parts by weight or more, about 180 parts by weight or more, or about 190 parts by weight or more, or may be about 350 parts by weight or less, 300 parts by weight or less, or 250 parts by weight or less, but is not limited thereto.

The slurry may also further comprise necessary known additives in addition to the above-mentioned components. However, for effectively obtaining the desired pore characteristics, the slurry may not contain a so-called foaming agent. The term foaming agent includes components which can exhibit a foaming effect in relation to other components in the slurry, as well as components commonly referred to in the industry as blowing agents other. Therefore, in the present application, the foaming process may not proceed during the process of manufacturing the metal foam.

The method of forming the metal foam precursor using the slurry is not particularly limited. In the field of manufacturing metal foams, various methods for forming metal foam precursors are known, and in the present application, all these methods can be applied. For example, the metal foam precursor can be formed by maintaining the slurry in a suitable template, or by coating the slurry in an appropriate manner.

When a metal foam is produced in the form of a film or sheet, and especially, a metal foam is produced in the form of a thin film or sheet, according to one example of the present application, it may be advantageous to apply a coating process. For example, after the slurry is coated on a suitable base material to form a precursor, the desired metal foam may be formed through a sintering process to be described below:

The shape of such a metal foam precursor is determined according to the desired metal foam and is not particularly limited. In one example, the metal foam precursor may be in the form of a film or sheet. For example, when the precursor is in the form of a film or sheet, the thickness may be 2,000 μm or less, 1,500 μm or less, 1,000 μm or less, 900 μm or less, 800 μm or less, 700 μm or less, 600 μm or less, 500 μm or less, 400 μm or less, 300 μm or less, 200 μm or less, 150 μm or less, about 100 μm or less, about 90 μm or less, about 80 μm or less, about 70 μm or less, about 60 μm or less, or about 55 μm or less. The metal foams have generally brittle characteristics due to their porous structural features, thereby being difficultly manufactured in the form of films or sheets, particularly thin films or sheets and having a problem of being easily broken even when they are manufactured. However, according to the method of the present application, it is possible to form a metal foam, in which pores are uniformly formed therein, while having a thin thickness, and having excellent mechanical characteristics.

Here, the lower limit of the thickness of the precursor is not particularly limited. For example, the precursor in the form of a film or sheet may also be about 5 μm or more, 10 μm or more or about 15 μm or more, 20 μm or more, 25 μm or more, 30 μm or more, 35 μm or more, 40 μm or more, 45 μm or more, 50 μm or more, 55 μm or more, 60 μm or more, 65 μm or more, 70 μm or more, or 75 μm or more or so.

In the forming process of the metal foam precursor, a suitable drying process may also be performed. For example, the metal foam precursor may also be formed by molding the slurry by a method such as the above-described coating and then drying it for a certain time. The conditions of the drying are not particularly limited, which can be controlled, for example, at a level where the solvent contained in the slurry can be removed to a desired level. For example, the drying may be performed by maintaining the molded slurry at a temperature in a range of about 50° C. to 250° C., about 70° C. to 180° C., or about 90° C. to 150° C. for an appropriate period of time. The drying time can also be selected from an appropriate range.

The metal foam precursor formed by such a method may be sintered to form a metal foam. In this case, the method of performing the sintering for producing the metal foam is not particularly limited, and a known sintering method can be applied. That is, the sintering can be performed in such a manner that an appropriate amount of heat is applied to the metal foam precursor in an appropriate manner.

In this case, the sintering conditions can be controlled such that the metal powder is connected to form the porous structure in consideration of the state of the applied metal foam precursor, for example, the composition of the slurry or the kind of the metal powder, and the specific conditions are not particularly limited.

For example, the sintering can be performed by maintaining the precursor at a temperature in the range of about 500° C. to 2000° C., 700° C. to 1500° C., or 800° C. to 1200° C., and the holding time may also be selected arbitrarily. In one example, the holding time may be in a range of about 1 minute to 10 hours or so, but is not limited thereto.

The composite material further comprises a polymer component present on the surface of the metal foam or in the interior of the metal foam, as described above, wherein the ratio (T/MT) of the total thickness (T) to the thickness (MT) of the metal foam in such a composite material may be 2.5 or less. In another example, the thickness ratio may be about 2 or less, about 1.9 or less, about 1.8 or less, about 1.7 or less, about 1.6 or less, 1.5 or less, 1.4 or less, 1.3 or less, 1.2 or less, 1.15 or less, or 1.1 or less. The lower limit of the thickness ratio is not particularly limited, but in one example, it may be about 1 or more, about 1.01 or more, about 1.02 or more, about 1.03 or more, about 1.04 or more or about 1.05 or more, about 1.06 or more, about 1.07 or more, about 1.08 or more, about 1.09 or more, about 1.1 or more, about 1.11 or more, about 1.12 or more, about 1.13 or more, about 1.14 or more, about 1.15 or more, about 1.16 or more, about 1.17 or more, about 1.18 or more, about 1.19 or more, about 1.2 or more, about 1.21 or more, about 1.22 or more, about 1.23 or more, about 1.24 or more, or about 1.25 or more. Under such a thickness ratio, it is possible to provide a composite material having excellent processability or impact resistance, and the like, while ensuring the desired thermal conductivity.

The kind of the polymer component included in the composite material is not particularly limited, which may be selected in consideration of, for example, processability, impact resistance, insulation properties or the like of the composite material. An example of the polymer component applicable in the present application may include one or more selected from the group consisting of known acrylic resins, silicone resins such as siloxane series, polyester resins such as PET (poly(ethylene terephthalate)), epoxy resins, olefin resins such as PP (polypropylene) or PE (polyethylene), urethane resins, polyamide resins, amino resins, and phenol resins, but is not limited thereto.

In one example, the ratio (MV/PV) of the volume (MV) of the metal foam and the volume (PV) of the polymer component contained in the composite material may be 10 or less. In another example, the ratio (MW/PV) (MV/PV) may be 9 or less, 8 or less, 7 or less, 6 or less, 5 or less, 4 or less, 3 or less, 2 or less, 1 or less, or 0.5 or less or so. The lower limit of the volume ratio is not particularly limited, which may be, for example, about 0.1 or so. The volume ratio can be calculated through the weight of the polymer component and the metal foam, included in the composite material, and the density of the relevant components.

The composite material may exhibit high magnetic permeability. For example, in the above-described film form, the composite material may exhibit specific magnetic permeability of 100 or more at a thickness in a range of 10 μm to 1 cm and 100 kHz to 300 kHz. In another example, the specific magnetic permeability may be 110 or more, 120 or more, 130 or more, 140 or more, 150 or more, 160 or more, 170 or more, 180 or more, 190 or more, or 200 or more. In another example, the specific magnetic permeability may be about 1,000 or less, 900 or less, 800 or less, 700 or less, 600 or less, 500 or less, 400 or less, or 300 or less or so.

The present application also relates to a method for producing a composite material in such a form. The manufacturing method may comprise a step of curing a curable polymer composition in a state where the polymer composition is present on the surface of or inside the metal foam.

The details of the metal foams applied in the above method are as described above, and specific matters of the composite material to be manufactured can also follow the above-described contents.

The applied polymer composition is not particularly limited as long as it can form the above-mentioned polymer component through curing or the like, and such polymer components are variously known in the art.

For example, the composite material can be prepared by performing the curing through a known method using a material having appropriate viscosity among known components.

Such a composite material of the present application exhibits excellent mechanical strength, electrical insulation, resistance to oxidation and heat, and the like together with high magnetic permeability, which can be applied to various applications requiring high magnetic permeability. The applicable application can be exemplified by various devices, and the like including an EMC core, a low-power high-inductance resonance circuit or a broadband transformer, and the like, or a wave absorber, and the like, but is not limited thereto.

Advantageous Effects

According to the present application, a composite material having high magnetic permeability and excellent other physical properties such as flexibility, electrical insulation, mechanical properties and/or resistance to heat or oxidation can be provided in a simple and economical process.

MODE FOR INVENTION

Hereinafter, the present application will be described in detail by way of examples and comparative examples, but the scope of the present application is not limited to the following examples.

1. Method of Confirming Specific Magnetic Permeability

The specific magnetic permeability of the materials of Examples or Comparative Example was measured with a Keysight 16454A instrument, where the area of 1 kHz to 10 MHz was scanned.

2. Method of Confirming Pore Distribution

The pore distribution of the applied metal foam was calculated by confirming SEM images, which were photographed at a magnification of 500 times using an electronic optical microscope (SEM, JEOL, JSM-7610F), with an image analyzer.

Example 1

As the metal foam, a metal foam having a porosity of about 75% and a thickness of about 80 μm was used, which was made of an alloy of iron and nickel (Fe/Ni=20/80).

Such a metal foam was prepared in the following manner. 5 g of the alloy (Fe/Ni=20/80) powder having an average particle diameter (median particle diameter, D50 particle diameter) of about 20 to 30 μm, 4 g of n-butanol and 1 g of ethylcellulose were mixed to prepare a slurry. After sintering the slurry, it was coated to be in the form of a film having a thickness of about 80 μm or so, dried in an oven at 120° C. for 10 minutes, and then sintered in a hydrogen/argon atmosphere at 1000° C. for about 2 hours or so to prepare the metal foam.

Figure 1:
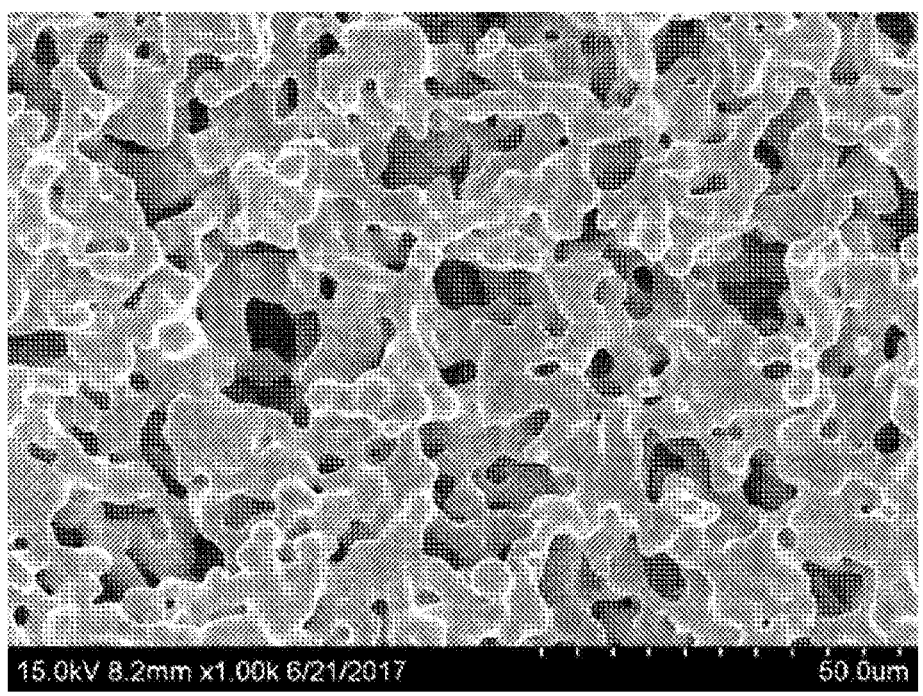
FIG. 1 is a photograph of the metal foam applied in Example 1.
Figure 2:
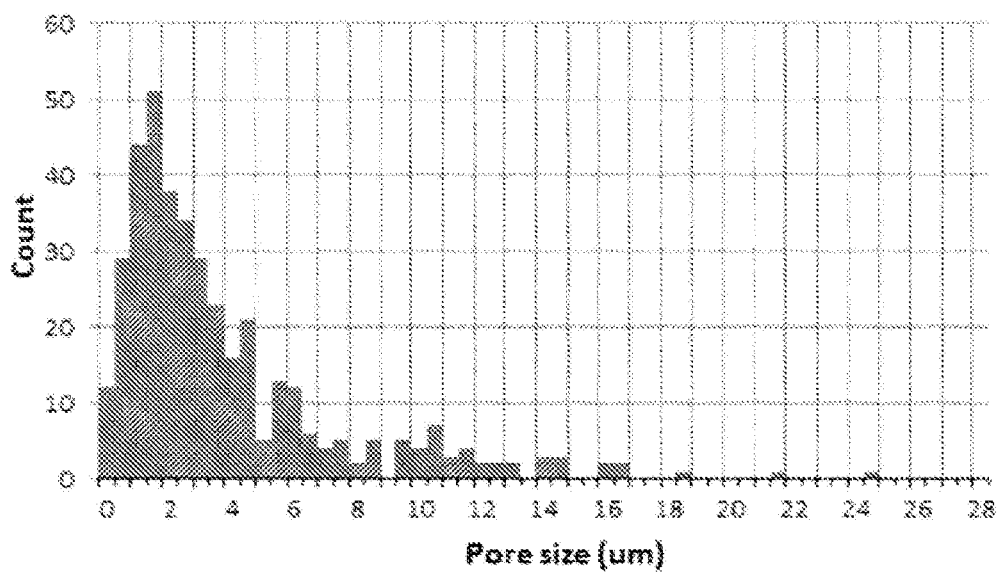
FIG. 2 is a view showing the pore distribution of the metal foam applied in Example 1.

FIGS. 1 and 2 show the photograph and the pore distribution of the metal foam thus prepared, respectively. An epoxy resin having a viscosity of about 9000 cP (manufacturer: Kukdo Chemical Co., Ltd., product name: KSR177) was applied to the metal foam, and an excessive amount of the composition was removed using a film applicator so that the final composite material had a thickness of about 110 μm or so.

Subsequently, the metal foam to which the epoxy resin was applied was kept in an oven at about 120° C. for about 1 hour and cured to produce a composite material in the form of a film.

The specific permeability of the composite material was 200 or more (100 to 300 kHz).

Example 2

A siloxane series resin (manufacturer: Dow Corning, product name: Sylgard 184) was applied to the metal foam prepared in Example 1, and an excessive amount of the composition was removed using a film applicator so that the final composite material had a thickness of about 100 μm or so. Subsequently, the material was kept in an oven at about 120° C. for about 1 hour or so and cured to produce a composite material in the form of a film. The magnetic permeability of the composite material was 200 or more (100 to 300 kHz).

Figure 3:
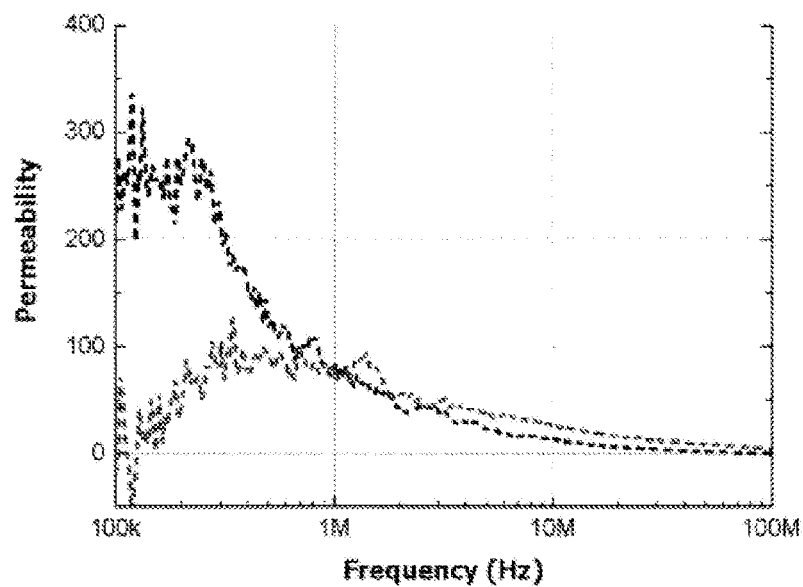
FIG. 3 is a graph of magnetic permeability of the composite material of Example 2.

FIG. 3 is a graph of specific magnetic permeability of the composite material of Example 2.

Example 3

An acrylate series resin (manufacturer: Aldrich, trade name: PMMA) was applied to the metal foam obtained in Example 1, and an excessive amount of the composition was removed using a film applicator so that the final composite material had a thickness of about 100 μm or so. Subsequently, the material was kept in an oven at about 120° C. for about 1 hour or so and cured to produce a composite material in the form of a film.

The specific magnetic permeability of the composite material was 190 or more (100 to 300 kHz).

Example 4

A polypropylene resin (manufacturer: Aldrich, trade name: Polypropylene) was applied to the metal foam obtained in Example 1, and an excessive amount of the composition was removed using a film applicator so that the final composite material had a thickness of about 100 μm or so. Subsequently, the material was cured to produce a composite material in the form of a film. The specific magnetic permeability of the composite material was 190 or more (100 to 300 kHz).

Example 5

As the metal foam, a metal foam having a porosity of about 72% and a thickness of about 80 μm, which was prepared using an alloy (Fe/Ni/Mo=15/80/5) powder of iron, nickel and molybdenum in the same manner as in Example 1, was used. An epoxy resin (manufacturer: Kukdo Chemical Co., Ltd., product name: KSR177) was applied to the metal foam and an excessive amount of the composition was removed using a film applicator so that the final composite material had a thickness of about 110 μm or so. Subsequently, the metal foam to which the epoxy resin was applied was treated under the same conditions as those of Example 1 to produce a composite material in the form of a film. The specific magnetic permeability of the composite material was 200 or more (100 to 300 kHz).

Example 6

Figure 4:
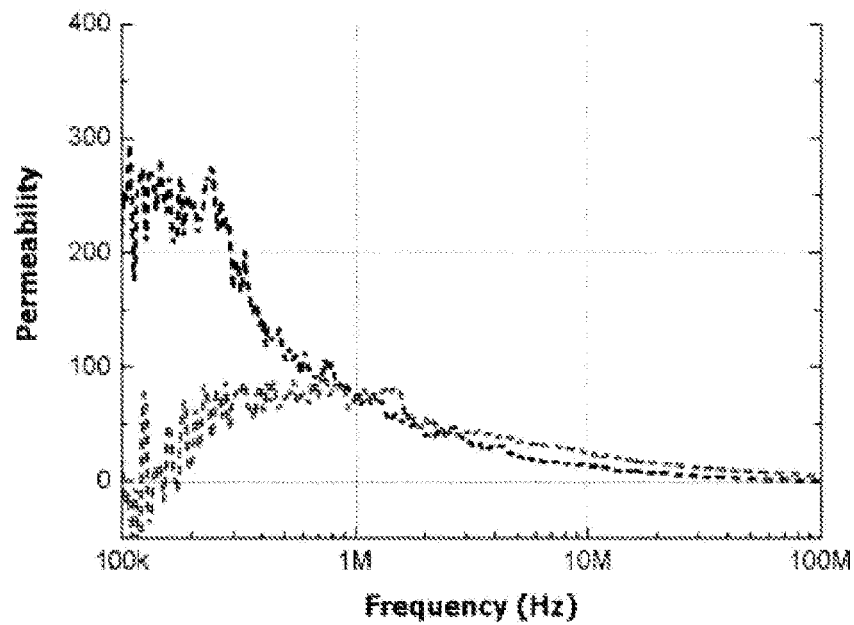
FIG. 4 is a graph of magnetic permeability of the composite material of Example 6.

As the metal foam, a metal foam having a porosity of about 70% and a thickness of about 80 μm, which was prepared using an alloy (Fe/Al/Si=85/6/9) powder of iron, aluminum and silicon in the same manner as in Example 1, was used. An epoxy resin (manufacturer: Kukdo Chemical Co., Ltd., product name: KSR177) was applied to the metal foam and an excessive amount of the composition was removed using a film applicator so that the final composite material had a thickness of about 100 μm or so. Subsequently, the metal foam to which the epoxy resin was applied was treated under the same conditions as those of Example 1 to produce a composite material in the form of a film. The magnetic permeability of the composite material was 150 or more (100 to 300 kHz). FIG. 4 is a graph of specific magnetic permeability of the composite material of Example 6.

Example 7

As the metal foam, a metal foam having a porosity of about 67% and a thickness of about 80 μm, which was prepared using an alloy (Fe/Si/B=75/15/10) powder of iron, silicon and boron in the same manner as in Example 1, was used. An epoxy resin (manufacturer: Kukdo Chemical Co., Ltd., product name: KSR177) was applied to the metal foam and an excessive amount of the composition was removed using a film applicator so that the final composite material had a thickness of about 120 μm or so. Subsequently, the metal foam to which the epoxy resin was applied was treated under the same conditions as those of Example 1 to produce a composite material in the form of a film. The specific magnetic permeability of the composite material was 120 or more (100 to 300 kHz).

Example 8

As the metal foam, a metal foam having a porosity of about 61% and a thickness of about 80 μm, which was prepared using an alloy (Fe/Si/B/Nb/Cu=74/13/9/3/1) powder of iron, silicon, boron, niobium and copper in the same manner as in Example 1, was used. An epoxy resin (manufacturer: Kukdo Chemical Co., Ltd., product name: KSR177) was applied to the metal foam and an excessive amount of the composition was removed using a film applicator so that the final composite material had a thickness of about 100 μm or so. Subsequently, the metal foam to which the epoxy resin was applied was treated under the same conditions as those of Example 1 to produce a composite material in the form of a film. The specific magnetic permeability of the composite material was 170 or more (100 to 300 kHz).

Comparative Example 1

As the metal foam, a metal foam having a porosity of about 65% and a thickness of about 80 μm, which was prepared using a copper powder in the same manner as in Example 1, was used. The siloxane series resin applied in Example 2 was applied to the metal foam and an excessive amount of the composition was removed using a film applicator so that the final composite material had a thickness of about 100 μm or so. Subsequently, the metal foam to which the epoxy resin was applied was treated under the same conditions as those of Example 2 to produce a composite material in the form of a film. The specific magnetic permeability of the composite material was 50 or less (100 to 300 kHz).

Comparative Example 2

An alloy (Fe/Al/Si=85/6/9) filler of iron, aluminum and silicon as a soft magnetic metal filler was mixed with a polypropylene resin and then molded into the form of a film having a thickness of about 120 μm or so using a film applicator and cured to produce a composite material in the form of a film.

The specific magnetic permeability of the composite material was 90 or so (100 to 300 kHz).

What is claimed is:

1. A composite material, comprising:
   a metal foam comprising a soft magnetic metal component; and
   a polymer component on a surface of or inside the metal foam,
   wherein the metal foam has a porosity of 50% or more, and
   wherein 85% or more of pores in the metal foam have a pore size of 10 μm or less.

2. The composite material according to claim 1, wherein the composite material is in the form of a film.

3. The composite material according to claim 2, wherein the composite material has a specific magnetic permeability of 100 or more at a thickness in a range of 10 μm to 1 cm and 100 kHz to 300 kHz.

4. The composite material according to claim 1, wherein the metal foam has a porosity of 60% or more.

5. The composite material according to claim 1, wherein 65% or more of pores in the metal foam have a pore size of 5 μm or less.

6. The composite material according to claim 1, wherein the soft magnetic metal component is an Fe/Ni alloy, an Fe/Ni/Mo alloy, an Fe/Al/Si alloy, an Fe/Si/B alloy, an Fe/Si/Nb alloy, an Fe/Si/Cu alloy or an Fe/Si/B/Nb/Cu alloy.

7. The composite material according to claim 1, wherein a ratio (T/MT) of a total thickness (T) of the composite material to a thickness (MT) of the metal foam is 1.01 or greater.

8. The composite material according to claim 1, wherein a ratio (T/MT) of a total thickness (T) of the composite material to a thickness (MT) of the metal foam is 2 or less.

9. The composite material according to claim 1, wherein the metal foam has a thickness of 10 μm or greater.

10. The composite material according to claim 1, wherein the polymer component forms a surface layer on the surface of the metal foam.

11. The composite material according to claim 1, wherein the polymer component comprises one or more resins selected from the group consisting of an acrylic resin, a silicone resin, an epoxy resin, an olefin resin, a polyester resin, a polyamide resin, a urethane resin, an amino resin and a phenol resin.

12. The composite material according to claim 1, wherein a ratio (MV/PV) of a volume (MV) of the metal foam to a volume (PV) of the polymer component is 10 or less.

13. A method of producing the composite material of claim 1, the method comprising:
    providing the metal foam;
    applying a curable polymer composition to the surface of or inside of the metal foam; and then
    curing the curable polymer composition on the surface of or inside the metal foam.

14. The method of claim 13 further comprising, before curing the curable polymer composition, removing a portion of the curable polymer composition applied to the metal foam using a film applicator.

15. The method of claim 13, wherein the curable polymer composition comprises an acrylic resin, a silicone resin, a polyester resin, an epoxy resins, an olefin resin, a urethane resin, a polyamide resin, an amino resin, or a phenol resin.

16. The method of claim 13, wherein the soft magnetic metal component is an Fe/Ni alloy, an Fe/Ni/Mo alloy, an Fe/Al/Si alloy, an Fe/Si/B alloy, an Fe/Si/Nb alloy, an Fe/Si/Cu alloy or an Fe/Si/B/Nb/Cu alloy.

* * * * *